D. A. SCHUTT.
COMBINED DISK HARROW AND SEEDER.
APPLICATION FILED NOV. 10, 1913.

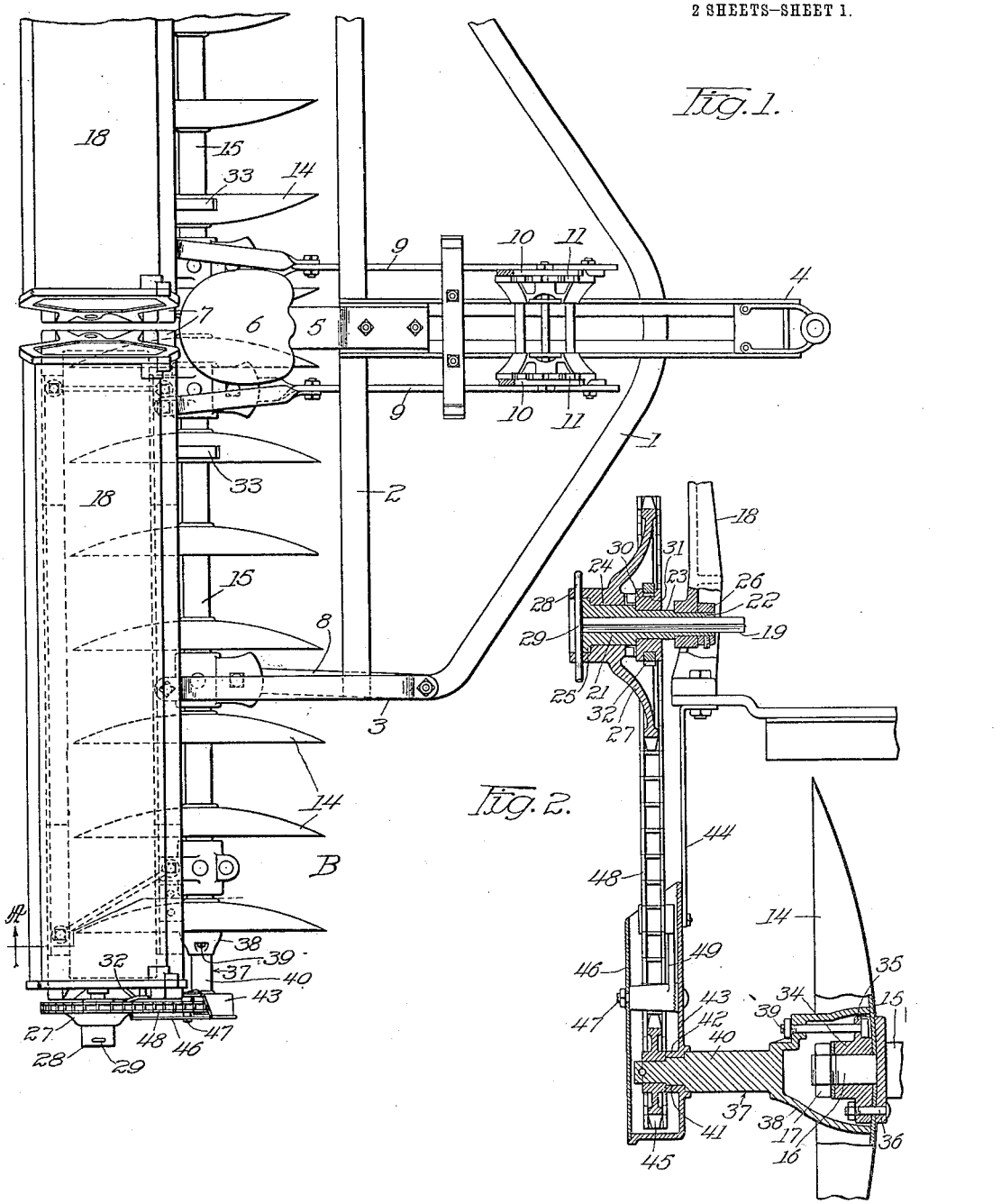

1,106,737.

Patented Aug. 11, 1914.
2 SHEETS—SHEET 2.

Witnesses:
T. N. Daggett
E. W. Burgess

Inventor:
Drury A. Schutt.
by Chas. E. Lord
Atty

UNITED STATES PATENT OFFICE.

DUNY A. SCHUTT, OF CHICAGO, ILLINOIS, ASSIGNOR TO INTERNATIONAL HARVESTER COMPANY OF NEW JERSEY, A CORPORATION OF NEW JERSEY.

COMBINED DISK HARROW AND SEEDER.

1,106,737.  Specification of Letters Patent.  Patented Aug. 11, 1914.

Application filed November 10, 1913. Serial No. 800,096.

*To all whom it may concern:*

Be it known that I, DUNY A. SCHUTT, a citizen of the United States, residing at Chicago, in the county of Cook and State of Illinois, have invented certain new and useful Improvements in Combined Disk Harrows and Seeders, of which the following is a full, clear, and exact specification.

My invention relates to combined disk harrows and seeders, and consists in improved means for transmitting motion from the rotatable disk gangs to the seed distributing shafts, and other structural elements to be described and claimed, and has for its object to provide simple and efficient means for mounting the seed distributing mechanism upon the gang frames and operatively connecting such mechanism with the rotatable disk gangs. These objects are attained by means of the mechanism illustrated in the accompanying drawings, in which—

Figure 3:
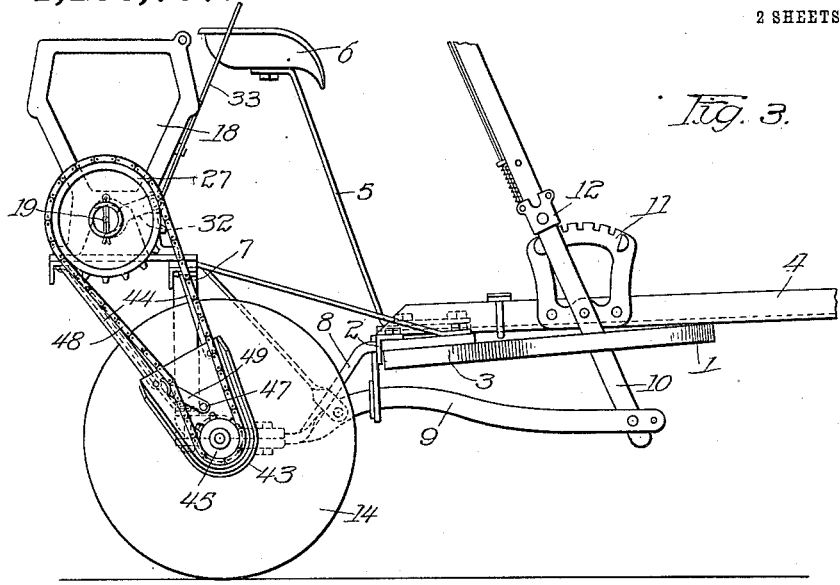
Figure 4:
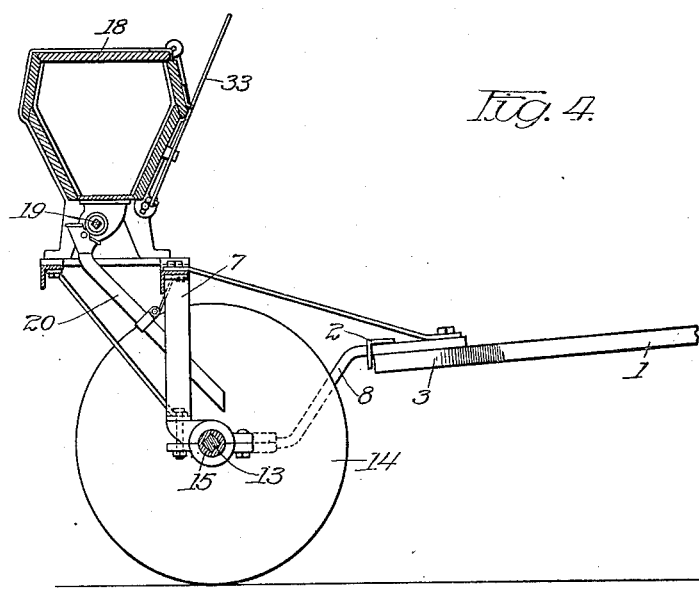

Figure 1 is a plan view of a disk harrow having my invention forming a part thereof; Fig. 2 is a sectional vertical elevation on an enlarged scale of the power transmitting mechanism connecting the gang axles with the seed distributing shafts; Fig. 3 is an end elevation of Fig. 1; and Fig. 4 is a cross section of Fig. 1 along line A—B.

The same reference characters designate like parts throughout the several views.

1 represents a common form of U-shaped harrow draft frame having a transversely disposed frame member 2 secured to its side members 3 and a draft member 4 to its middle part, the rear end of the draft member being secured to the frame member 2.

5 represents a seat supporting member having its lower end secured to the draft member 4, and 6 a seat carried by its upper end.

7 represents gang frames that are pivotally connected with the frame 1 by means of draft members 8, and 9 represents adjusting bars having their rear ends connected with the inner ends of the disk gangs and their front ends with set levers 10 that are pivotally mounted upon the draft frame and provided with a common form of notched sectors 11 and detent mechanism 12 for securing the gangs in adjusted position. The disk gangs include rotatable axles 13 having a series of disks 14 in spaced relation and connected by the usual spools 15; the associated parts of the mechanism being secured together by axle members 16 and nuts 17.

18 represents separate seed boxes carried by the gang frames, each of said boxes having a rotatable seed distributing shaft 19 journaled at the bottom thereof, the seed being conducted from the boxes to the ground by means of the usual seed tubes 20. The seed distributing shafts are angular in cross section and extend beyond the opposite ends of the seed boxes, and 21 represents a sleeve member having an axial opening that receives the shafts and a cylindrical inner part 22 journaled in a bearing member forming part of the box end, and an intermediate angular part 23 terminating in an enlarged cylindrical part 24 provided with a flanged head 25, and 26 represents a collar secured to the reduced inner end of the sleeve and operative to secure the sleeve against endwise movement in one direction.

27 represents a sprocket wheel journaled upon the cylindrical part 24 of the sleeve, its outer end having projecting ear members 28, through which is passed a pin 29, the flanged head 25 abutting the pin and coöperating with the flanged head to secure the sprocket wheel against lateral movement in either direction. The inner end of the hub of the sprocket wheel 27 is provided with clutch teeth, and 30 represents a slidable clutch member mounted upon the angular part 23 of the sleeve 21 and having complemental clutch teeth upon one face adapted to engage with the clutch teeth upon the sprocket wheel, and a peripheral groove 31 adapted to receive the forked end of a clutch shipping member 32 that is controlled by a hand lever 33 pivotally mounted upon the seed box.

34 represents a sleeve member mounted upon the end of the gang axle member 16, between the securing nut 17 and the outside disk of the series, the sleeve being provided with a flanged head 35 that contacts with the disk and is secured to the disk by means of bolts 36 passing through the flanged disk and the flanged head of the adjacent spool 15.

37 represents a gang axle extension provided with an inner bowl-shaped part 38 that incloses the end of the gang axle and is secured in operative position by means of bolts 39 received by an opening in the flanged head 35 of the sleeve member 34 and the inner wall of the bowl. The bowl terminates in a cylindrical axially alined stem 40, having a reduced end portion 41 that is journaled in a bearing box formed in the inner wall 42 of a casing 43, the upper end of the casing being connected with the gang frame by means of a bar 44. The stem 40 is reduced in diameter outside of the bearing portion 41, and 45 represents a sprocket wheel secured thereto. The casing 43 is provided with a removable wall 46 upon its face that is secured thereto by means of a bolt 47.

48 represents a sprocket chain operatively connecting the two sprocket wheels, and 49 a chain tightener arm carried by the bolt 47.

I have shown and described a preferred construction of my invention, but minor changes may be made in the structural details thereof without departing from the spirit of my invention.

What I claim as my invention, and desire to secure by Letters Patent, is:

1. In a combined disk harrow and seeder, in combination, a disk gang frame, a rotatable gang axle journaled upon said frame, an extension secured to the outside end of said gang axle, a sprocket wheel secured to said extension and rotatable therewith, a seed box carried by said gang frame, a seed distributing shaft rotatably journaled at the bottom of said seed box and extending beyond the outside end wall thereof, a sleeve mounted upon the end of said shaft, having its inner end journaled in the end wall of the box, a sprocket wheel rotatably mounted upon the opposite end of said sleeve, a clutch mechanism mounted upon said sleeve adjacent said sprocket wheel, and a sprocket chain operatively connecting the two sprocket wheels.

2. A combined disk harrow and seeder comprising, in combination, a disk gang frame, a rotatable gang axle journaled upon said frame, an extension secured to the outside end of said gang axle, a sprocket wheel secured to said extension and rotatable therewith a seed box carried by said gang frame, a seed distributing shaft journaled at the bottom of said seed box and extending beyond the outside end wall thereof, a sleeve mounted upon the extended end of said shaft and rotatable therewith, said sleeve having its inner end journaled in the end wall of the box, an angular part intermediate the ends thereof, and a cylindrical bearing part ends thereof terminating in a flanged head, a sprocket wheel journaled upon said cylindrical part and provided with clutch teeth upon the inner end of its hub, and projecting ear members at the opposite end thereof, pins passing through said ear members and abutting said flanged head, a clutch member slidably mounted upon the angular part of said sleeve and adapted to engage with the clutch teeth upon the head of the adjacent sprocket wheel, a collar secured to the inner end of said sleeve, and a sprocket chain operatively connecting the two sprocket wheels.

3. A combined disk harrow and seeder having, in combination, disk gang frames, rotatable gang axles journaled in said frames, axle extensions secured to the outside ends of said gang axles, sprocket wheels secured to said extensions and rotatable therewith, seed boxes carried by said gang frames, seed distributing shafts journaled in the bottom of said boxes and extending beyond the outside end walls thereof, sleeves mounted upon the extended parts of said shafts, rotatable therewith and having their ends journaled in the end walls of said boxes, sprocket wheels journaled upon the outside ends of said sleeves and secured against lateral movement thereon, said sprocket wheels provided with clutch members upon their inner sides, slidable clutch members carried by said sleeves and adapted to operatively engage with said sprocket wheels, said slidable clutch member being rotatable with said sleeves, and sprocket chains operatively connecting the sprocket wheels carried by said sleeves with those carried by said axle extensions.

In testimony whereof I affix my signature, in the presence of two witnesses.

DUNY A. SCHUTT.

Witnesses:
 F. W. HOFFMEISTER,
 H. L. VALSUP.